United States Patent
Müller et al.

(10) Patent No.: US 9,718,642 B2
(45) Date of Patent: Aug. 1, 2017

(54) DEVICE FOR DETECTING POSITION OF AN ELEVATOR CAR WITH MECHANICAL SWITCHING MEANS

(71) Applicant: ELGO ELECTRONIC GMBH & CO. KG, Rielasingen (DE)

(72) Inventors: Frank Müller, Dortmund (DE); Heiko Essinger, Rielasingen (DE)

(73) Assignee: ELGO ELECTRONIC GMBH & CO. KG, Rielasingen (DE)

( * ) Notice: Subject to any disclaimer, the term of this patent is extended or adjusted under 35 U.S.C. 154(b) by 685 days.

(21) Appl. No.: 14/352,228

(22) PCT Filed: Oct. 18, 2012

(86) PCT No.: PCT/EP2012/070697
§ 371 (c)(1),
(2) Date: Aug. 25, 2014

(87) PCT Pub. No.: WO2013/057216
PCT Pub. Date: Apr. 25, 2013

(65) Prior Publication Data
US 2015/0008076 A1 Jan. 8, 2015

(30) Foreign Application Priority Data
Oct. 18, 2011 (DE) .................... 20 2011 051 667 U

(51) Int. Cl.
*B66B 1/34* (2006.01)
*B66B 5/06* (2006.01)
(Continued)

(52) U.S. Cl.
CPC .............. *B66B 5/06* (2013.01); *B66B 1/3492* (2013.01); *B66B 5/0031* (2013.01); *G01B 7/003* (2013.01);
(Continued)

(58) Field of Classification Search
CPC ....... B66B 5/06; B66B 1/3492; B66B 5/0031; G01B 7/003; G01B 7/02; G01D 5/12; G01P 1/00
(Continued)

(56) References Cited

U.S. PATENT DOCUMENTS 4,418,795 A * 12/1983 Trosky .................. B66B 5/0025
187/391
4,798,267 A 1/1989 Foster et al.
(Continued)

FOREIGN PATENT DOCUMENTS

| CN | 1085520 A | 4/1994 |
| CN | 1608966 A | 4/2005 |

(Continued)

OTHER PUBLICATIONS

Chinese Office Action for CN Application No. 201280062455.5 dated Feb. 29, 2016.

*Primary Examiner* — Anthony Salata
(74) *Attorney, Agent, or Firm* — Bachman & LaPointe, PC

(57) ABSTRACT

A device for detecting the position of an elevator car (40) by a sensor and evaluation unit (20, 22, 24), accommodated in a sensor housing (10), which can be arranged on the elevator car, is designed for interaction with a strip (14) having a length and/or position coding and which is connected via a cable connection (26) to a switching unit that is accommodated separately from the sensor housing in a switching housing (12). The switching unit has a safety switch (30) and/or an interrupter contact for an emergency function, especially an emergency stop, of the elevator car. A switching device is associated with the position detecting device for inputting and storing a speed threshold value, the safety
(Continued)

switch or interrupter contact being activated when said threshold value is reached or exceeded.

10 Claims, 2 Drawing Sheets

(51) Int. Cl.
    *G01B 7/00*     (2006.01)
    *G01B 7/02*     (2006.01)
    *B66B 5/00*     (2006.01)
    *G01D 5/12*     (2006.01)
    *G01P 1/00*     (2006.01)

(52) U.S. Cl.
    CPC ............... *G01B 7/02* (2013.01); *G01D 5/12* (2013.01); *G01P 1/00* (2013.01)

(58) Field of Classification Search
    USPC .................... 187/247, 277, 391, 393, 394
    See application file for complete search history.

(56) References Cited

U.S. PATENT DOCUMENTS

| | | | |
|---|---|---|---|
| 4,832,158 A | 5/1989 | Farrar et al. | |
| 5,313,026 A * | 5/1994 | Youla | B66B 1/3492 187/394 |
| 5,407,028 A * | 4/1995 | Jamieson | B66B 5/10 187/287 |
| 5,421,432 A | 6/1995 | Strambi et al. | |
| 5,880,417 A * | 3/1999 | Koh | B66B 1/3492 187/282 |
| 7,073,633 B2 * | 7/2006 | Weinberger | B66B 5/0025 187/247 |
| 7,353,914 B2 | 4/2008 | Deplazes | |
| 7,533,763 B2 | 5/2009 | Kattainen et al. | |
| 7,597,176 B2 | 10/2009 | Zaharia | |
| 7,775,329 B2 * | 8/2010 | Eckenstein | B66B 1/32 187/277 |
| 7,775,330 B2 * | 8/2010 | Kattainen | B66B 5/04 187/287 |
| 8,230,977 B2 * | 7/2012 | Thumm | B66B 1/34 187/247 |
| 8,272,482 B2 * | 9/2012 | Takahashi | B66B 1/32 187/288 |
| 8,365,873 B2 * | 2/2013 | Viita-Aho | B66B 5/0031 187/314 |
| 8,820,482 B2 * | 9/2014 | De Coi | B66B 5/0031 187/247 |
| 2004/0216320 A1 * | 11/2004 | Birrer | B66B 1/3492 33/708 |
| 2005/0082121 A1 | 4/2005 | Deplazes | |
| 2007/0227831 A1 | 10/2007 | Zaharia | |
| 2008/0128217 A1 | 6/2008 | Kattainen et al. | |
| 2008/0202862 A1 | 8/2008 | Dudde et al. | |
| 2014/0353090 A1 * | 12/2014 | Muller | B66B 1/3492 187/393 |

FOREIGN PATENT DOCUMENTS

| | | |
|---|---|---|
| CN | 101151203 A | 3/2008 |
| CN | 101258088 A | 9/2008 |
| DE | 102009054337 A1 | 6/2011 |
| EP | 1277689 A1 | 1/2003 |
| EP | 1621504 A1 | 2/2006 |
| GB | 2201656 A | 9/1988 |
| JP | 2008509868 A | 4/2008 |
| WO | 8102288 A1 | 8/1981 |

* cited by examiner

DEVICE FOR DETECTING POSITION OF AN ELEVATOR CAR WITH MECHANICAL SWITCHING MEANS

BACKGROUND OF THE INVENTION

The present invention relates to a device for detecting the position of an elevator car.

Such devices are generally known from the prior art, wherein for example DE 10 2009 054 337 A1 by the applicant discloses a generic device of this kind.

In connection with safety-relevant elevator technology it is known and is standard practice to assign to a respective elevator car (for transporting persons or loads) a generic sensor and control unit in a suitable sensor housing. In the operation of the elevator the sensor technology of this sensor and control unit accommodated in the sensor housing interacts with the strip which is suitably provided on or in the elevator shaft and equipped with the typically magnetic coding, and by reading this encoding can then carry out an appropriate position determination and, derived therefrom, a speed determination of the elevator car.

So-called emergency systems are also to be assumed as known from the prior art. A typical emergency system of this type provides, for example, that in response to a critical operational state and/or motion state of the elevator car, such as the elevator car exceeding a threshold (possibly one dependent on a current position), security measures are automatically triggered, such as the triggering of a braking function for the elevator motor or the activation of a safety brake for the elevator car.

The detection reliability assumes particular importance here, and therefore the sensor and control units are usually designed to be redundant, i.e. two functional units which are provided substantially parallel to each other and operated independently of each other, can each activate the emergency function in response to the detection of, for example, the speed threshold being exceeded.

In the field of elevator engineering it is also increasingly common to work with standardized systems and associated modules, which when installed at a deployment site are then adapted to the prevailing installation conditions, in particular the existing control and safety electronics being suitably parameterised and configured. In this context, after assembly of the sensor housing and the switching housing it is also standard practice to configure the sensor and control unit appropriately and in this context, in particular, also to set the speed threshold, which is determined, for example, by appropriate structural specifications, regulatory requirements or special conditions at the installation site. Since the electronics constituting the sensor and control unit is typically implemented using microcontrollers or similar technology, the parameterization and configuration is a task which is typically also performed during commissioning by the technicians involved using electronic means, typically via a data bus and a dedicated terminal connected thereto (e.g. a PC). Although in this context a suitably programmed configuration interface does indeed allow reliable device operation and, to a large extent, one that is insensitive compared to operational and setting errors, in terms of practical handling on the elevator however, in particular also during subsequent maintenance and management (where such a configuration system is often not available), it is cumbersome and time-consuming. Add to this the fact that usually known sensor and control units are not normally fitted with a permanently visible display or similar display unit, so that a maintenance technician cannot identify a current configuration or parameterisation state (e.g. a currently set speed threshold) without connected PC-hardware.

In addition, with such an electronic configuration there is also the disadvantage that a power failure or other fault could lead to potential misconfigurations, to a loss of the stored data or to similar undefined and therefore potentially security-compromised configuration states, so that there is a need for improvement in this respect.

The object of the present invention is, therefore, to improve a generic device for detecting the position of an elevator car known from the prior art in terms of its ease of use and security in the parameterisation of the critical emergency function, in particular with regard to the setting and storage of the speed threshold.

SUMMARY OF THE INVENTION

The object is solved by the device of the present invention for detecting the position of an elevator car.

In an advantageous manner according to the invention and departing from a standard configuration and parameterisation by the electrical connection to a data processing unit, the setting of at least the speed threshold for the safety switch or the circuit breaker is effected according to the invention by manually activated, mechanical switching means.

Importantly for its practical usage in installation, parameterisation and in long-term deployment, this has numerous advantages compared with the procedure from the prior art: for one, the installer or operator can manually operate the switching means directly at the deployment site without, as is required in the prior art, first needing to connect special configuration infrastructure items. In addition, such a mechanical approach typically also allows a current switching state to be recognised, in particular when, as provided for in the context of preferred exemplary embodiments, for example, a dip-switch arrangement is used for encoding at least one, preferably a plurality of possible speed thresholds; here it is possible to identify the speed threshold to which the system is currently configured simply by reading it off.

Finally, the manually activated and mechanical switching means according to the invention offer the further advantage, for example in the event of a power outage or other fault, of not losing e.g. a programmed (or electronically configured) signal or of being in an undefined (and not clearly identifiable) configuration state. Typically, this not only significantly increases the operating safety, but in addition it means that it is always clear with which (currently set) speed threshold the emergency function of the elevator car will be activated.

In addition to a DIP-switch (or a corresponding multi-way switch arrangement), other mechanical setup and switching technologies are also conceivable, such as jumpers, (manually activated) changeover switches or the like and also, again in addition or as an alternative, contact solutions that can be set up irreversibly, for example in the form of conductor tracks having suitable disconnection positions, which are then, in accordance with a desired coding, disconnected at setup and thereby permanently and irreversibly set in their coding state.

The present invention is not limited to only one speed threshold; rather as part of a preferred extension of the invention, it is possible by means of the mechanical switching means (enabling a corresponding encoding) to be able to set up two or more speed thresholds (and store them accordingly using the position then mechanically set), for example, with regard to different selectable operating, maintenance or diagnostic states of a respective elevator system.

It is also possible, in accordance with an extension, that e.g. the emergency function, dependent on the speed, may be designed in a multi-stage manner, wherein e.g. on reaching a first speed threshold a first emergency function is triggered (such as the activation of a motor brake), and then on reaching a second (e.g. higher) speed threshold a second emergency function is triggered, such as a safety brake for the elevator car. Such a two-stage or multi-stage functionality as a preferred embodiment of the invention then enables a response with graduated safety measures to respective possible malfunctions of the system, represented in each case by detected speeds of the elevator car relative to multiple speed thresholds.

It is preferable in the context of the invention, on the one hand, for the system to be coded in an absolute manner; this means that at each travel position of the elevator car relative to the coded strip a respective absolute position of the elevator car can be determined, without first (as in the case of a relative coding) having to move it to a known end- or stop position in order then to determine the distance travelled from there by a suitably incremental method (and then based on this, the current position). Such an absolute coding method offers advantages in particular in the event of unexpected operational failures, such as a power outage (which would then also potentially adversely affect detection of the route travelled in the case of a relative positioning).

Such a coding is equally advantageous if current speed information can be determined from it by the sensor and control unit according to the invention with little effort. This speed information in turn, when used in comparison with the at least one speed threshold, then forms a basis for a safe operation of the elevator.

While it is also possible according to the invention that (only) those electronic modules are present in the sensor housing which, in addition to performing the sensor signal evaluation and speed detection, in particular also monitor for the elevator reaching or exceeding the (at least one) speed threshold, in the context of the present invention and in accordance with the concept of a distributed system it is nevertheless possible as an alternative both to equip the sensor housing with appropriate electronic control circuit modules (also preferably redundantly), and also to provide in the control unit, in addition to an actual passive switching unit and the mechanical switching means according to the invention, active electronic components, such as an electronic assembly to communicate with the electronic assembly provided in the sensor body via the cable connection.

As a result the present invention provides an extremely flexible system with increased practical usability, maintainability, and therefore also configurational and operational reliability, which combines simple adaptability and operability with easy accessibility and legibility of a current configuration, this in turn associated with effective storage of a selected configuration.

BRIEF DESCRIPTION OF THE DRAWINGS

Further advantages, features and details of the invention can be found in the following description of preferred exemplary embodiments and from the drawings, which show in FIG. 1 a schematic representation of the device according to the invention for position detection, as a two-part arrangement consisting of a sensor housing and switching housing, and mechanical switching means provided on or in the switching housing.

DETAILED DESCRIPTION

Figure 3:
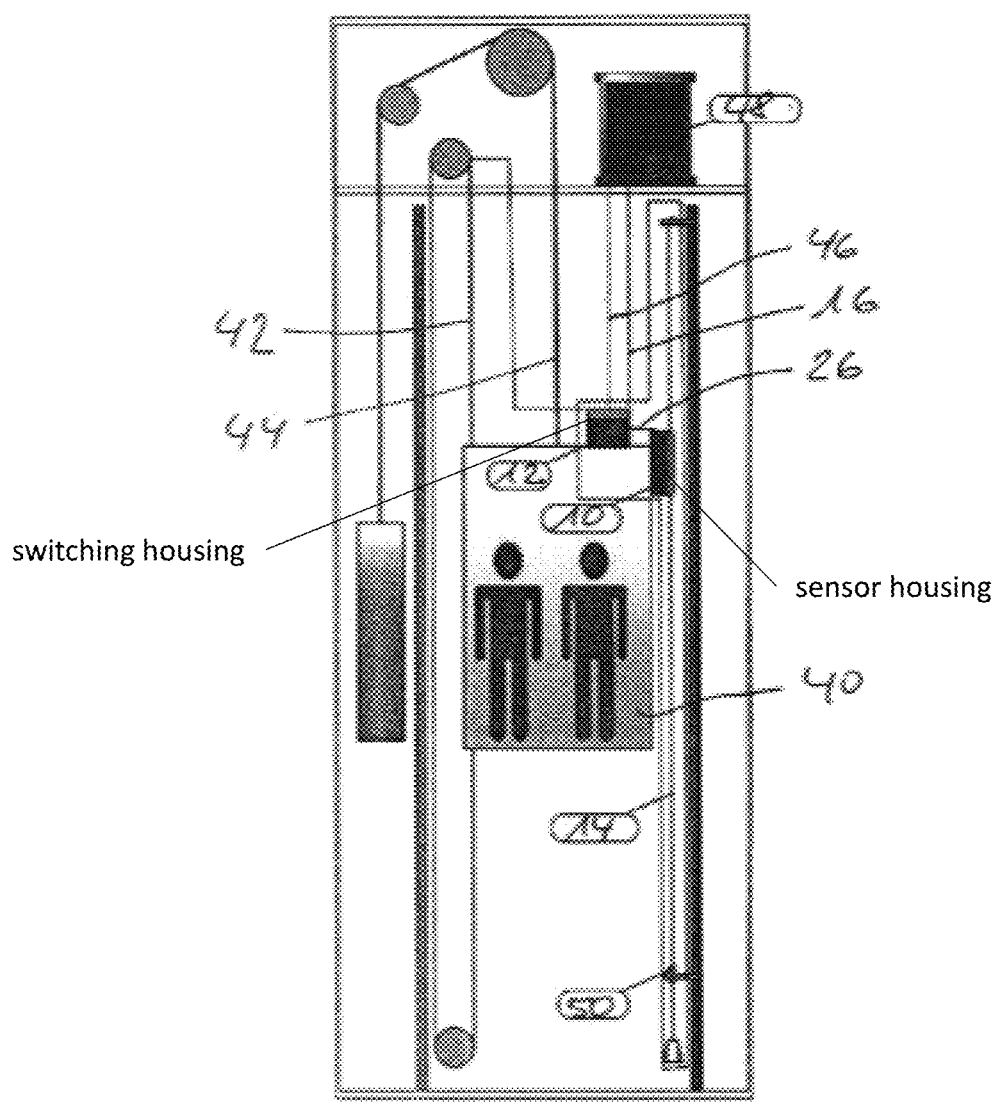

FIG. 3 relating to the background of the invention illustrates in schematic form an elevator system with an elevator car 40 which, as shown schematically, can be moved on a drive unit 42, 44 in the vertical direction in the elevator shaft.

On the elevator car 40 is seated a device for position detection, consisting of a sensor housing 10 and a switching housing 12 connected thereto via a cable connection 26. This switching housing 12 is connected via a conductor arrangement 46 to an elevator control unit 48 seated in the front-facing region of the elevator shaft, from where the various operating states of the elevator system shown can be controlled.

The sensor housing, having a sensor and control unit for position detection and for determining an elevator speed therefrom, works in conjunction with a fixed magnetic tape 14, which is braced with clamping means and extends in the vertical direction in a quasi-stationary manner in the elevator shaft. On the bottom side a switching unit 50 for marking an end position is provided.

In an otherwise known manner, such as that described in DE 10 2009 054 337 A1 of the applicant, the sensor and control unit in the sensor housing 10 preferably has an arrangement of magnetic sensors, which read a (permanent-magnetic) encoding of the magnetic tape and convert it into position information; with a position signal that is varied (by movement of the elevator car), a basis for a determination of the car is also available.

Connected to the sensor housing 10 via the cable 26, the sensor housing 12 first of all makes the connection to the elevator control unit 48. In addition, the switching housing 12 contains different safety-related units, in particular a switching unit which can be activated for an emergency function. This switching unit typically consists of a relay, which in response to an activation triggers a brake operation (such as a motor brake of the elevator drive 42, 44, or alternatively a safety brake, not shown, suitably provided in the elevator shaft) and thus brings the elevator car to a halt.

Figure 1:
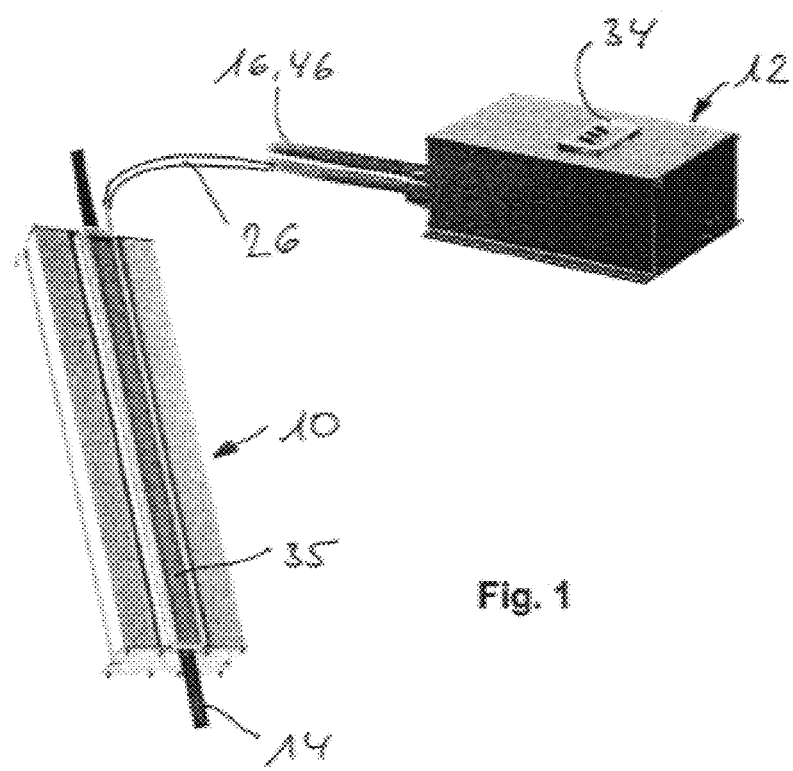
Figure 2:
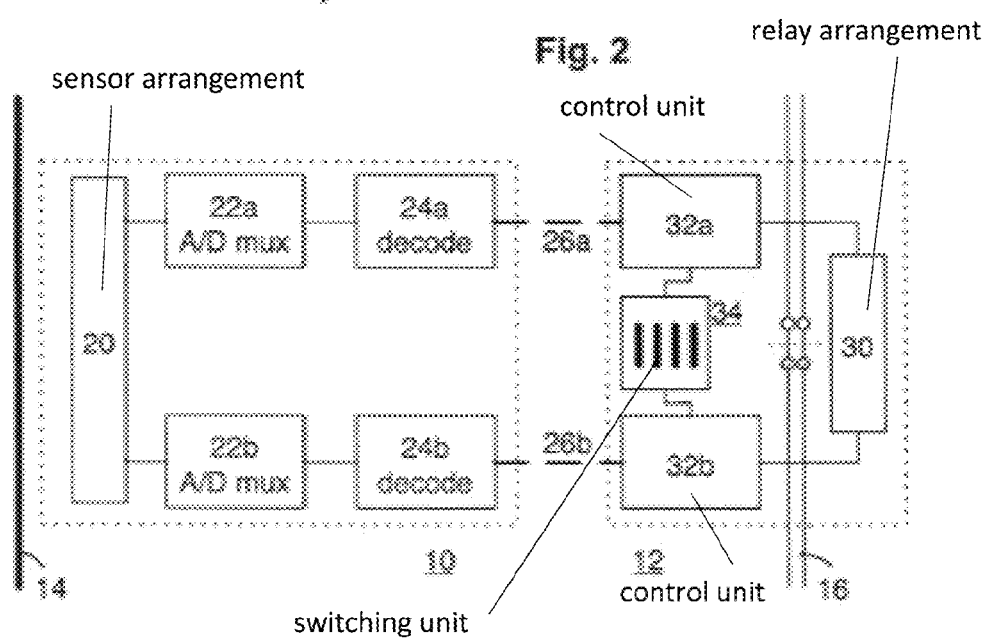
FIG. 2 a block diagram to illustrate essential functional components of the units shown concretely in FIG. 1 and FIG. 3 a schematic view of an elevator system to illustrate the background of the present invention.

The FIGS. 1 and 2 relating to the device for position detection according to the invention, in accordance with the exemplary embodiment shown, illustrate essential elements of the solution. First, the illustration of FIG. 1 with the sensor housing shows how (in otherwise known manner) the magnetic tape (magnetic strip) 14 is scanned in the manner of a sliding carriage; this extends, behind a retaining strip 35, in a longitudinal groove on the housing 10.

As illustrated in FIG. 2 in this regard, the sensor housing 10 contains the sensor and control unit in a redundant arrangement: a magnetic-field sensor arrangement 20, shown schematically, (compare e.g. the above cited DE 10 2009 054 337 A1 for further explanation) is first amplified redundantly in the form of two parallel branches (a/b) set up independently of each other and, A/D-converted and converted into a multiplexed signal (units 22a, 22b), whereupon the actual decoding, including a fine positioning by extrapolation of the permanent magnet signals detected (in otherwise known manner) is then carried out in the units 24a, 24b.

This functionality of the units 22, 24 (for the branches a, b respectively) are implemented in the form of typical, microcontroller-based circuit configurations, which are suitably programmed for the purpose.

The reference numerals 26a, 26b of the cable connection 26 illustrate how the redundant sensor and control unit 22, 24 in the sensor housing 10 communicates with the switching housing 12 over two channels, which first of all has a relay arrangement 30, triggerable by both branches, with the safety function shown. Thus, in particular, an interruption of the associated conductor 16 leads to a triggering of the described safety function(s), such as a motor brake and/or a safety brake for the elevator car.

This control functionality is implemented in the exemplary embodiment by a control unit 32, again provided in pairwise manner (a/b), which is provided in the switching housing 12, and which determines from a signal received from the unit 24 a current elevator speed and compares this with at least one predetermined speed threshold, which is coded and/or predefined by a manually actuatable mechanical switching unit 34. More precisely, comparably to FIG. 1, FIG. 2, the switching unit 34 is implemented as a DIP-switch unit that can be operated manually and on a surface of the housing, in which case, in otherwise known manner, an installer/operator can encode a switch pattern by mechanically moving or sliding individual switches. This is can then not only be analysed or processed electronically, but can also be observed (and thus read off) externally.

With such a coding the operator can for example, set up a first and a second speed threshold, wherein, if a current car speed exceeds a stored normal value by 10% a first emergency function is triggered in the form of the motor brake, and if the speed exceeds it by 15% a second emergency function is triggered in the form of a safety brake for the elevator car.

Depending on the intended application, conditions at the deployment site or similar requirements, the present invention therefore offers the possibility of adapting the behaviour of these security features in a flexible and very simple manner. At the same time the mechanical switching means 34 according to the invention also not only enable a respective switching state, and thus coding state, to be reliably read at any time, but in addition this state is reliably mechanically coded and therefore insensitive to, for example, a loss of information in the event of a fault (e.g. power failure).

The present invention is not limited to the above embodiment shown; rather the present invention comprises both the fact that the sensor and control unit and the switching unit are set up in a different way to each other (in particular by non-redundant single-channel variants or for interacting with an optically, mechanically and/or relatively coded tape), but also, for example, the switching means shown offer the facility to mechanically encode additional operational parameters and/or elevator functions.

The invention claimed is:

1. Device for detecting the position of an elevator car, comprising a sensor and control unit accommodated in a sensor housing, which is provided on the elevator car and is designed to interact with a strip having a length and/or position encoding, which is connected via a cable connection to a switching unit provided in a switching housing separately from the sensor housing, the switching unit provides a safety switch and/or circuit breaker for an emergency function of the elevator car and the device for position detection includes means for inputting and storing a speed threshold, which when reached or exceeded, activate the safety switch or circuit breaker, wherein the means for inputting and storage have mechanical switching means provided in the switching housing, the mechanical switching means is capable of being manually activated.

2. The device according to claim 1, wherein the mechanical switching means has at least one of a DIP switch and a jumper.

3. The device according to claim 1, wherein the mechanical switching means has a changeover switch having at least one switch contact pair.

4. The device according to claim 1, wherein the mechanical switching means has conductor means which are irreversible by manual intervention in the contacting state, a destructively interruptible conductor track.

5. The device according to claim 1, wherein the mechanical switching means is designed for setting two different speed thresholds.

6. The device according to claim 1, wherein the mechanical switching means is arranged for additionally configuring elevator operating parameters and position detection parameters.

7. The device according to claim 1, wherein a switching state of the mechanical switching means is evaluated by an electronic control unit, implemented by means of a microcontroller or microprocessor unit, provided in the switching housing.

8. The device according to claim 7, wherein the sensor and control unit is designed for interacting with a strip bearing an absolute encoding and for determining a speed information signal.

9. The device according to claim 8, wherein the sensor and control unit is redundantly fitted with a pair of electronic control units carrying out a speed measurement of the elevator car independently of each other.

10. The device according to claim 9, wherein a part of a control and/or analysis functionality of the sensor and control unit comprises an electronic assembly provided in the switching housing and communicating with the sensor and control unit via the cable connection.

\* \* \* \* \*